US009363469B2

(12) United States Patent
Wells (10) Patent No.: US 9,363,469 B2
(45) Date of Patent: Jun. 7, 2016

(54) PASSIVE-ACTIVE TERMINAL ADAPTER AND METHOD HAVING AUTOMATIC RETURN LOSS CONTROL

(75) Inventor: Chad T. Wells, Highlands Ranch, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 1419 days.

(21) Appl. No.: 12/175,366

(22) Filed: Jul. 17, 2008

(65) Prior Publication Data

US 2010/0017842 A1  Jan. 21, 2010

(51) Int. Cl.
| | |
|---|---|
| H04N 7/173 | (2011.01) |
| H04N 7/10 | (2006.01) |
| H04N 7/16 | (2011.01) |
| H04N 21/442 | (2011.01) |
| H04N 21/25 | (2011.01) |
| H04N 5/63 | (2006.01) |
| H04M 11/06 | (2006.01) |

(52) U.S. Cl.
CPC ............. H04N 7/104 (2013.01); *H04M 11/066* (2013.01); *H04N 5/63* (2013.01); *H04N 7/102* (2013.01); *H04N 21/25* (2013.01); *H04N 21/4424* (2013.01); *H04N 21/44231* (2013.01)

(58) Field of Classification Search
CPC ....... H04N 5/63; H04N 5/4425; H04N 7/102; H04N 7/104; H04N 21/442; H04N 21/44231; H04N 21/4424; H04N 21/4425; H04N 4/63; H04N 4/4425; H04M 11/066
USPC .............. 725/120, 127, 149, 78–82; 348/730; 333/124, 129
See application file for complete search history.

(56) References Cited

U.S. PATENT DOCUMENTS

| | | | |
|---|---|---|---|
| 2,662,217 A | 12/1953 | Roberts | |
| 3,790,909 A | 2/1974 | Le Fevre | |
| 3,939,431 A | 2/1976 | Cohlman | |
| 4,306,403 A | 12/1981 | Hubbard et al. | |
| 4,328,470 A * | 5/1982 | Bumgardner | H03B 9/12 307/106 |
| 4,344,499 A | 8/1982 | Van Der Lely et al. | |
| 4,395,767 A * | 7/1983 | Van Brunt | G01R 31/046 714/724 |
| 4,418,424 A | 11/1983 | Kawamoto et al. | |
| 4,512,033 A | 4/1985 | Schrock | |
| 4,520,508 A | 5/1985 | Reichert, Jr. | |

(Continued)

FOREIGN PATENT DOCUMENTS

| | | |
|---|---|---|
| JP | 55-080989 A | 6/1980 |
| JP | 55-132126 A | 10/1980 |

(Continued)

OTHER PUBLICATIONS

PCT/US2010/049568 International Search Report May 31, 2011.

*Primary Examiner* — Pankaj Kumar
*Assistant Examiner* — Reuben M Brown
(74) *Attorney, Agent, or Firm* — MH2 Technology Law Group, LLP (57) ABSTRACT

Return loss due to excessive signal reflection into a cable television (CATV) network from an inoperative or abnormally operative terminal adapter is minimized, to communicate enhanced passive downstream signals to passive subscriber devices such as "life-line" telephone sets. A predetermined termination impedance is substituted for an active branch circuit of the terminal adapter whenever reduced input voltage, over-current or under-current conditions exist in the terminal adapter.

35 Claims, 4 Drawing Sheets

(56) References Cited

U.S. PATENT DOCUMENTS

| | | | |
|---|---|---|---|
| 4,521,920 A | 6/1985 | Forsberg et al. | |
| 4,648,123 A | 3/1987 | Schrock | |
| 4,677,390 A | 6/1987 | Wagner | |
| 4,715,012 A | 12/1987 | Mueller, Jr. | |
| 4,961,218 A | 10/1990 | Kiko | |
| 4,982,440 A | 1/1991 | Dufresne et al. | |
| 5,010,399 A | 4/1991 | Goodman et al. | |
| 5,126,686 A | 6/1992 | Tam | |
| 5,126,840 A | 6/1992 | Dufresne et al. | |
| 5,214,505 A | 5/1993 | Rabowsky et al. | |
| 5,231,660 A | 7/1993 | West, Jr. | |
| 5,235,612 A | 8/1993 | Stilwell et al. | |
| 5,245,300 A | 9/1993 | Sasaki | |
| 5,345,504 A | 9/1994 | West, Jr. | |
| 5,361,394 A | 11/1994 | Shigihara | |
| 5,369,642 A | 11/1994 | Shioka et al. | |
| 5,389,882 A | 2/1995 | I'Anson et al. | |
| 5,485,630 A * | 1/1996 | Lee et al. | 725/78 |
| 5,548,255 A | 8/1996 | Spielman | |
| 5,557,319 A | 9/1996 | Gurusami et al. | |
| 5,557,510 A | 9/1996 | McIntyre et al. | |
| 5,631,795 A * | 5/1997 | Koyama | G08B 26/005 340/635 |
| 5,740,044 A | 4/1998 | Ehrenhardt et al. | |
| 5,745,836 A | 4/1998 | Williams | |
| 5,745,838 A | 4/1998 | Tresness et al. | |
| 5,815,794 A | 9/1998 | Williams | |
| 5,818,825 A | 10/1998 | Corrigan et al. | |
| 5,839,052 A | 11/1998 | Dean et al. | |
| 5,893,024 A | 4/1999 | Sanders et al. | |
| 5,937,330 A | 8/1999 | Vince et al. | |
| 5,945,793 A * | 8/1999 | Park et al. | 315/411 |
| 5,950,111 A | 9/1999 | Georger et al. | |
| 5,956,075 A | 9/1999 | Matsuo | |
| 5,970,053 A | 10/1999 | Schick et al. | |
| 6,012,271 A | 1/2000 | Wilkens et al. | |
| 6,014,547 A | 1/2000 | Caporizzo et al. | |
| 6,049,693 A | 4/2000 | Baran et al. | |
| 6,069,960 A | 5/2000 | Mizukami et al. | |
| 6,094,211 A | 7/2000 | Baran et al. | |
| 6,101,932 A | 8/2000 | Wilkens | |
| 6,128,040 A * | 10/2000 | Shinbori et al. | 348/372 |
| 6,129,187 A | 10/2000 | Bellanger et al. | |
| 6,160,990 A | 12/2000 | Kobayashi et al. | |
| 6,173,225 B1 | 1/2001 | Stelzle et al. | |
| 6,185,432 B1 * | 2/2001 | Vembu | 455/522 |
| 6,205,138 B1 | 3/2001 | Nihal et al. | |
| 6,229,375 B1 | 5/2001 | Koen | |
| 6,253,077 B1 | 6/2001 | Burt et al. | |
| 6,348,837 B1 | 2/2002 | Ibelings | |
| 6,348,955 B1 | 2/2002 | Tait | |
| 6,373,349 B2 | 4/2002 | Gilbert | |
| 6,377,316 B1 | 4/2002 | Mycynek et al. | |
| 6,388,539 B1 | 5/2002 | Rice | |
| 6,425,132 B1 | 7/2002 | Chappell | |
| 6,430,904 B1 | 8/2002 | Coers et al. | |
| 6,495,998 B1 | 12/2002 | Terreault | |
| 6,498,925 B1 | 12/2002 | Tauchi | |
| 6,510,152 B1 | 1/2003 | Gerszberg et al. | |
| 6,546,705 B2 | 4/2003 | Scarlett et al. | |
| 6,550,063 B1 | 4/2003 | Matsuura | |
| 6,560,778 B1 | 5/2003 | Hasegawa | |
| 6,570,914 B1 | 5/2003 | Ichihara | |
| 6,570,928 B1 | 5/2003 | Shibata | |
| 6,587,012 B1 | 7/2003 | Farmer et al. | |
| 6,622,304 B1 | 9/2003 | Carhart | |
| 6,640,338 B1 | 10/2003 | Shibata | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,725,463 B1 | 4/2004 | Birleson | |
| 6,728,968 B1 | 4/2004 | Abe et al. | |
| 6,737,935 B1 | 5/2004 | Shafer | |
| 6,757,910 B1 | 6/2004 | Bianu | |
| 6,758,292 B2 | 7/2004 | Shoemaker | |
| 6,804,828 B1 | 10/2004 | Shibata | |
| 6,843,044 B2 | 1/2005 | Clauss | |
| 6,845,232 B2 | 1/2005 | Darabi | |
| 6,868,552 B1 | 3/2005 | Masuda et al. | |
| 6,877,166 B1 | 4/2005 | Roeck et al. | |
| 6,880,170 B1 | 4/2005 | Kauffman et al. | |
| 6,915,530 B1 | 7/2005 | Kauffman et al. | |
| 6,920,614 B1 * | 7/2005 | Schindler et al. | 715/726 |
| 6,928,175 B1 | 8/2005 | Bader et al. | |
| 6,942,595 B2 | 9/2005 | Hrazdera | |
| 7,003,275 B1 | 2/2006 | Petrovic | |
| 7,029,293 B2 | 4/2006 | Shapson et al. | |
| 7,039,432 B2 | 5/2006 | Strater et al. | |
| 7,048,106 B2 | 5/2006 | Hou | |
| 7,127,734 B1 * | 10/2006 | Amit | 725/80 |
| 7,162,731 B2 | 1/2007 | Reidhead et al. | |
| 7,167,693 B2 | 1/2007 | Bachman et al. | |
| 7,254,827 B1 | 8/2007 | Terreault | |
| 7,283,479 B2 | 10/2007 | Ljungdahl et al. | |
| 7,399,255 B1 | 7/2008 | Johnson et al. | |
| 7,404,355 B2 | 7/2008 | Viaud et al. | |
| 7,416,068 B2 | 8/2008 | Ray et al. | |
| 7,454,252 B2 | 11/2008 | El-Sayed | |
| 7,464,526 B2 | 12/2008 | Coenen | |
| 7,505,819 B2 | 3/2009 | El-Sayed | |
| 7,508,284 B2 | 3/2009 | Shafer | |
| 7,530,091 B2 | 5/2009 | Vaughan | |
| 7,592,883 B2 | 9/2009 | Shafer | |
| 7,603,693 B2 | 10/2009 | Masuda et al. | |
| 7,742,777 B2 | 6/2010 | Strater et al. | |
| 7,748,023 B2 | 6/2010 | Weinstein et al. | |
| 8,001,579 B2 | 8/2011 | Olson et al. | |
| 8,213,457 B2 | 7/2012 | Kelma et al. | |
| 8,286,209 B2 | 10/2012 | Egan et al. | |
| 2001/0016950 A1 | 8/2001 | Matsuura | |
| 2002/0141347 A1 | 10/2002 | Harp et al. | |
| 2002/0141494 A1 | 10/2002 | Chappell | |
| 2002/0144292 A1 | 10/2002 | Uemura et al. | |
| 2002/0166124 A1 | 11/2002 | Gurantz et al. | |
| 2002/0174423 A1 | 11/2002 | Fifield et al. | |
| 2002/0174435 A1 | 11/2002 | Weinstein et al. | |
| 2003/0084458 A1 | 5/2003 | Ljungdahl et al. | |
| 2003/0169068 A1 * | 9/2003 | Fotouhi | H03K 19/007 326/30 |
| 2004/0076192 A1 | 4/2004 | Zerbe et al. | |
| 2004/0113652 A1 * | 6/2004 | Lundberg | H03K 19/0005 326/30 |
| 2004/0119551 A1 * | 6/2004 | Wray | H01P 1/268 333/22 R |
| 2004/0147273 A1 | 7/2004 | Morphy | |
| 2004/0172659 A1 | 9/2004 | Ljungdahl et al. | |
| 2004/0229561 A1 | 11/2004 | Cowley et al. | |
| 2005/0034168 A1 | 2/2005 | Beveridge | |
| 2005/0047051 A1 | 3/2005 | Marland | |
| 2005/0144649 A1 | 6/2005 | Bertonis et al. | |
| 2005/0155082 A1 | 7/2005 | Weinstein et al. | |
| 2005/0183130 A1 | 8/2005 | Sadja et al. | |
| 2005/0210977 A1 | 9/2005 | Yan | |
| 2005/0283815 A1 | 12/2005 | Brooks et al. | |
| 2005/0289632 A1 | 12/2005 | Brooks et al. | |
| 2006/0015921 A1 | 1/2006 | Vaughan | |
| 2006/0041918 A9 | 2/2006 | Currivan et al. | |
| 2006/0148406 A1 | 7/2006 | Strater et al. | |
| 2006/0191359 A1 | 8/2006 | Tarasinski et al. | |
| 2006/0205442 A1 | 9/2006 | Phillips et al. | |
| 2006/0241838 A1 | 10/2006 | Mongiardo et al. | |
| 2006/0282871 A1 | 12/2006 | Yo | |
| 2007/0024393 A1 | 2/2007 | Forse et al. | |
| 2007/0146949 A1 * | 6/2007 | Nishimura | H04N 5/63 361/90 |
| 2007/0288981 A1 | 12/2007 | Mitsuse et al. | |
| 2007/0288982 A1 | 12/2007 | Donahue | |
| 2008/0001645 A1 | 1/2008 | Kuroki | |
| 2008/0022344 A1 | 1/2008 | Riggsby | |
| 2008/0040764 A1 | 2/2008 | Weinstein et al. | |
| 2008/0075012 A1 | 3/2008 | Zielinski et al. | |
| 2008/0120667 A1 | 5/2008 | Zaltsman | |
| 2008/0127287 A1 | 5/2008 | Alkan et al. | |
| 2008/0157898 A1 | 7/2008 | Palinkas et al. | |

(56) References Cited

U.S. PATENT DOCUMENTS

| | | |
|---|---|---|
| 2008/0247401 A1 | 10/2008 | Bhal et al. |
| 2008/0247541 A1 | 10/2008 | Cholas et al. |
| 2008/0271094 A1 | 10/2008 | Kliger et al. |
| 2008/0313691 A1 | 12/2008 | Cholas et al. |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0153263 A1 | 6/2009 | Lin |
| 2009/0154369 A1 | 6/2009 | Helvig et al. |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0316608 A1 | 12/2009 | Singh et al. |
| 2009/0320085 A1 | 12/2009 | Wang |
| 2010/0100912 A1 | 4/2010 | Olson et al. |
| 2010/0100921 A1 | 4/2010 | Olson et al. |
| 2010/0194489 A1 | 8/2010 | Kearns et al. |
| 2010/0225813 A1 * | 9/2010 | Hirono et al. .............. 348/554 |
| 2010/0266000 A1 | 10/2010 | Froimovich et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells et al. |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2012/0081190 A1 | 4/2012 | Rijssemus |

FOREIGN PATENT DOCUMENTS

| | | |
|---|---|---|
| JP | 55132126 | 10/1980 |
| JP | 58-99913 | 12/1981 |
| JP | 57-091055 A | 6/1982 |
| JP | 57091055 | 6/1982 |
| JP | 58-101582 A | 6/1983 |
| JP | 58-99913 | 7/1983 |
| JP | 59026709 | 8/1984 |
| JP | 61-157035 A | 7/1986 |
| JP | 61157035 | 7/1986 |
| JP | 05-191416 A | 7/1993 |
| JP | 07-038580 A | 2/1995 |
| JP | 11-069334 A | 3/1999 |
| JP | 11069334 | 3/1999 |
| JP | 2001-177580 A | 6/2001 |
| JP | 2004080483 | 3/2004 |
| JP | 2005005875 | 1/2005 |
| JP | 2007-166109 A | 6/2007 |
| JP | 2007-166110 A | 6/2007 |
| WO | WO-0024124 A1 | 4/2000 |
| WO | WO-0172005 A1 | 9/2001 |
| WO | WO-0233969 A1 | 4/2002 |
| WO | WO-02091676 A1 | 11/2002 |

* cited by examiner

PASSIVE-ACTIVE TERMINAL ADAPTER AND METHOD HAVING AUTOMATIC RETURN LOSS CONTROL

This invention relates to transmission and reception of radio- or high-frequency signals over cable networks, such as cable television (CATV) networks. More particularly, the present invention relates to a new and improved passive-active terminal adapter and method which delivers high-frequency signals to subscriber devices in a way that automatically maintains high signal integrity by minimizing return losses in the event of an inoperative or abnormally operative condition of the terminal adapter.

BACKGROUND OF THE INVENTION

Cable television (CATV) service providers offer television, data, telephone and other entertainment and useful services to subscribers at the subscriber's premises.

The typical medium for delivering these services is a cable network which is formed by a relatively large number of high-frequency, electrical signal-conducting coaxial conductors or cables, all of which are linked together to distribute the high-frequency signals over a wide geographic area to substantial numbers of geographically-separated subscribers. The high-frequency signals are delivered to television sets, computers, telephones and other subscriber devices, and those subscriber devices convert the information carried by the high-frequency signals into the services that the subscriber desires.

Because of the extensive nature of the cable network, the signals received at the subscriber premises are reduced in strength compared to the strength of the transmitted signals. The amount of signal strength reduction depends on the length of the pathway through the cable network which the signals pass before arriving at the subscriber premises. For this reason, it is typical to provide an amplifier at the subscriber premises to increase or amplify the strength of the signals received from the cable network before delivering the signals to the subscriber devices.

Some types of subscriber devices, such as television sets, deliver better performance in response to receiving amplified signals. Other types of subscriber devices may require non-amplified or passive signals for proper functionality. For example, "life-line" telephone service operates on the basis of passive signals received at the customer premises, because the functionality of such telephone service can not depend on the proper functionality of an amplifier or other active signal conditioner in the signal path. A failed or inoperative amplifier or other active device in the signal path could completely terminate telephone communications, which could be dangerous in emergency situations.

Passive-active terminal adapters have been developed to provide both passive and amplified signals at the subscriber premises for the two different types of subscriber devices which operate from passive and amplified (active) signals. Such passive-active terminal adapters include a splitter which essentially divides or branches the incoming or "downstream" signals from the cable network into passive downstream signals and active downstream signals. The passive downstream signals are conducted through a passive branch of the terminal adapter without amplification or modification and applied to those subscriber devices which require passive signals for operation, such as, for example, a voice modem for a telephone set. The active downstream signals are conducted to an amplifier or active signal conditioner of an active branch of the terminal adapter. The amplifier or signal conditioner amplifies the strength of the signals or modifies some characteristic of the signals before the amplified or conditioned signals are delivered to one or more subscriber devices. The amplified or conditioned signals benefit the performance and functionality of the subscriber devices, such as a television sets and computers.

The high-frequency signals conducted through the cable network are susceptible to distortion from a number of sources. It is for this reason that coaxial cables are widely used to shield the high-frequency signals from degrading influences of the ambient environment. One requirement for maintaining high-quality signal conduction in a coaxial cable is properly terminating the coaxial cable. An improper termination causes reflections of the incident signals back into the transmission path. The reflections cause degradation of the desired incident signals received by the subscriber. The degradations are exemplified by amplitude ripple, group delay ripple, latency, and other similar effects which distort or reduce the incident signals. The signal reflections cause the subscriber to experience a degraded quality of service, or in some cases the level of degradation may be so severe as to prevent the subscriber from receiving meaningful service.

SUMMARY OF THE INVENTION

It has been discovered that a passive-active terminal adapter of the type having a splitter and an amplifier, or other active signal conditioner, may cause unwanted signal reflection, known as return loss, in the downstream incident signals, thereby degrading the quality of service received by the subscriber. Under such circumstances, proper or adequate functionality of passive subscriber devices, such as telephone sets, may become impossible or problematic due to the relatively high amount of distortion and return loss caused by the signal reflections.

The principal cause of excessive return loss is a failed, improperly-functioning or inoperative amplifier, other active signal conditioner or some other active component of an active branch in a passive-active terminal adapter. The amplifier or signal conditioner may become inoperative from a loss of electrical power, as would occur when the commercial power supply to the customer premises is interrupted or diminished, or if a power supply line to the terminal adapter is broken or disconnected. The amplifier or signal conditioner could also become abnormally inoperative due to internal component failure or degradation. Such component failure or degradation can have the effect of causing the terminal adapter to consume too much current or short-circuit, or to consume too little current. In either case, the excessive or inadequate current consumption indicates that the amplifier or signal conditioner or some other component of the terminal adapter is not functioning properly.

An inoperative or abnormally operative component of the terminal adapter creates an improper termination due to the defective condition of the terminal adapter. The improper termination reflects signals into the cable network, and those reflected signals degrade the passive signals. The degraded passive signals degrade the operation of the passive subscriber devices or possibly even prevent use of those devices.

In accordance with the above described discoveries and recognitions, one aspect of the present invention pertains to automatically minimizing the amount of return loss in a passive-active terminal adapter if a malfunction occurs in the terminal adapter. The passive-active terminal adapter includes a signal splitter which separates downstream signals into active branch downstream signals that are conducted to an active branch circuit and into passive branch downstream signals that are conducted to a passive branch circuit. A sensor is connected to sense and respond to inoperative and abnormally operative conditions of the terminal adapter. A switch is connected between the signal splitter and the active branch circuit. The switch has a first operative position which conducts the active branch downstream signals from the splitter to the active branch circuit, and a second operative position which conducts the downstream active branch signals from the splitter to a predetermined termination impedance. The second operative position disconnects the active branch circuit and substitutes the predetermined termination impedance, thereby properly terminating the active branch to prevent or minimize reflected signals which prevents or minimizes return loss. The sensor responds to normal operating conditions to control the switch into the first operative position, and the sensor responds to inoperative or abnormally operative conditions to control the switch into the second operative position.

Another aspect of the invention relates to a method of minimizing return loss in a passive-active terminal adapter. Return loss is minimized by recognizing an inoperative or abnormally operative condition, and in response, substituting a predetermined termination impedance for the active branch circuit. The substituted termination impedance minimizes signal reflections and minimizes return loss in the passive signals conducted from the splitter through the passive branch circuit to a subscriber device.

Other subsidiary aspects of the invention relate to sensing electrical power supplied to determine the inoperative and abnormally operative conditions, sensing the voltage of the electrical power supplied, and sensing the current conducted to determine the inoperative or abnormally operative condition, selecting a value for the termination impedance which reduces signal reflections to the passive branch circuit, and selecting a value for the termination impedance which is substantially equal to a characteristic impedance of a coaxial cable from the cable network connected to the terminal adapter, among other things. A voice modem or an EMTA (Embedded Multimedia Terminal Adapter) is preferably connected to the terminal adapter to receive the passive branch signals.

Other aspects of the invention, and a more complete appreciation of the present invention, as well as the manner in which the present invention achieves the above described and other improvements, can be obtained by reference to the following detailed description of a presently preferred embodiment taken in connection with the accompanying drawings, which are briefly summarized below, and by reference to the appended claims.

DETAILED DESCRIPTION

Figure 1:
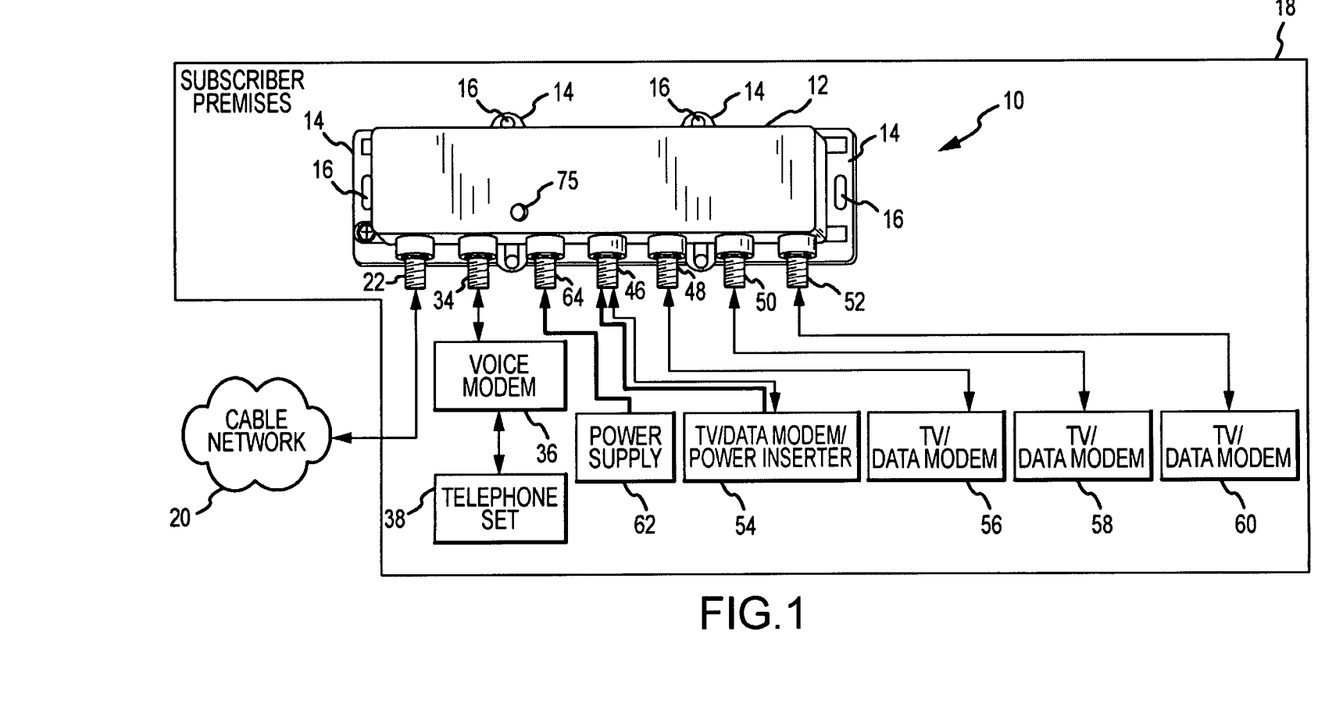
FIG. 1 is a perspective view of a passive-active terminal adapter which incorporates the present invention, shown connected to a cable network and subscriber devices located at a subscriber's premises, which are illustrated in block diagram form.

A passive-active terminal adapter 10 which incorporates the present invention is shown in FIG. 1. The terminal adapter 10 includes a housing 12 which encloses active and passive internal electronic circuit components (shown in FIGS. 2 and 3). A mounting flange 14 surrounds the housing 12, and holes 16 in the flange 14 allow attachment of the terminal adapter 10 to a support structure at a subscriber's premises 18. Downstream high-frequency signals are supplied from a headend (not shown) of a cable network 20, such as a cable television (CATV) network, and the downstream signals are delivered to the terminal adapter 10 at an input/output cable port 22 connected to the cable network 20.

Figure 2:
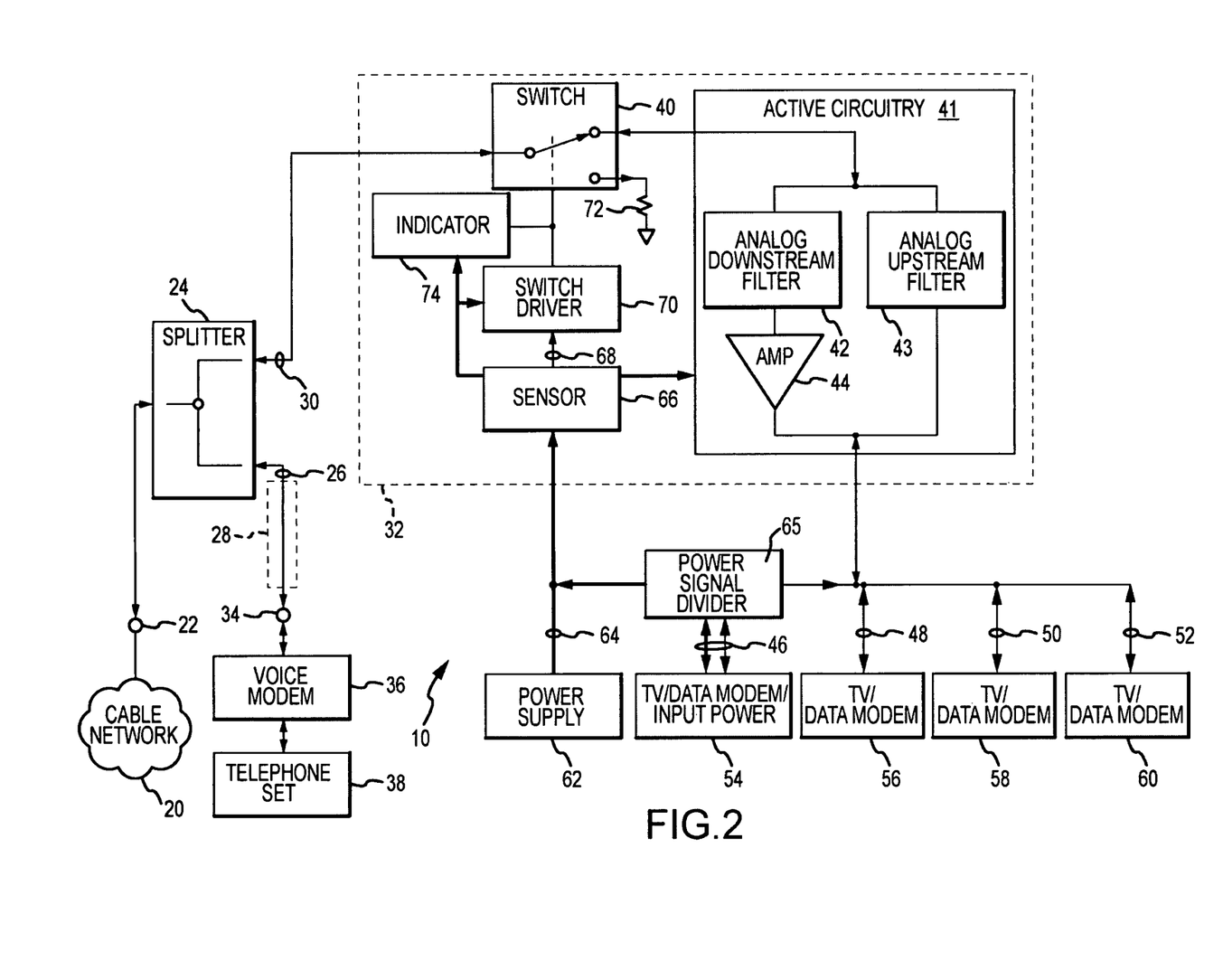
FIG. 2 is a block diagram of components within the passive-active terminal adapter shown in FIG. 1.

The passive and active internal electronic circuit components within the housing 12, shown in FIG. 2, include a conventional directional coupler or signal splitter 24 which separates the input downstream signals from the cable network 20 at the cable port 22 into a passive branch downstream signals 26, which are conducted through a passive branch circuit 28, and into an active branch downstream signals 30, which are conducted through an active branch circuit 32.

The passive branch downstream signals 26 are delivered from a passive port 34 to those subscriber devices which respond to passive signals, such as a voice modem 36 connected to a telephone set 38, or an embedded multimedia terminal adapter (EMTA, not shown) which is located at the subscriber premises 18 (FIG. 1). The telephone set 38 and the voice modem 36, or the EMTA, generate upstream signals which are delivered to the passive port 34 and are conducted through the passive branch circuit 28 and the splitter 24 and are applied to the cable port 22 and conducted over the cable network 20 to the headend (not shown) of the cable network.

Figure 3:
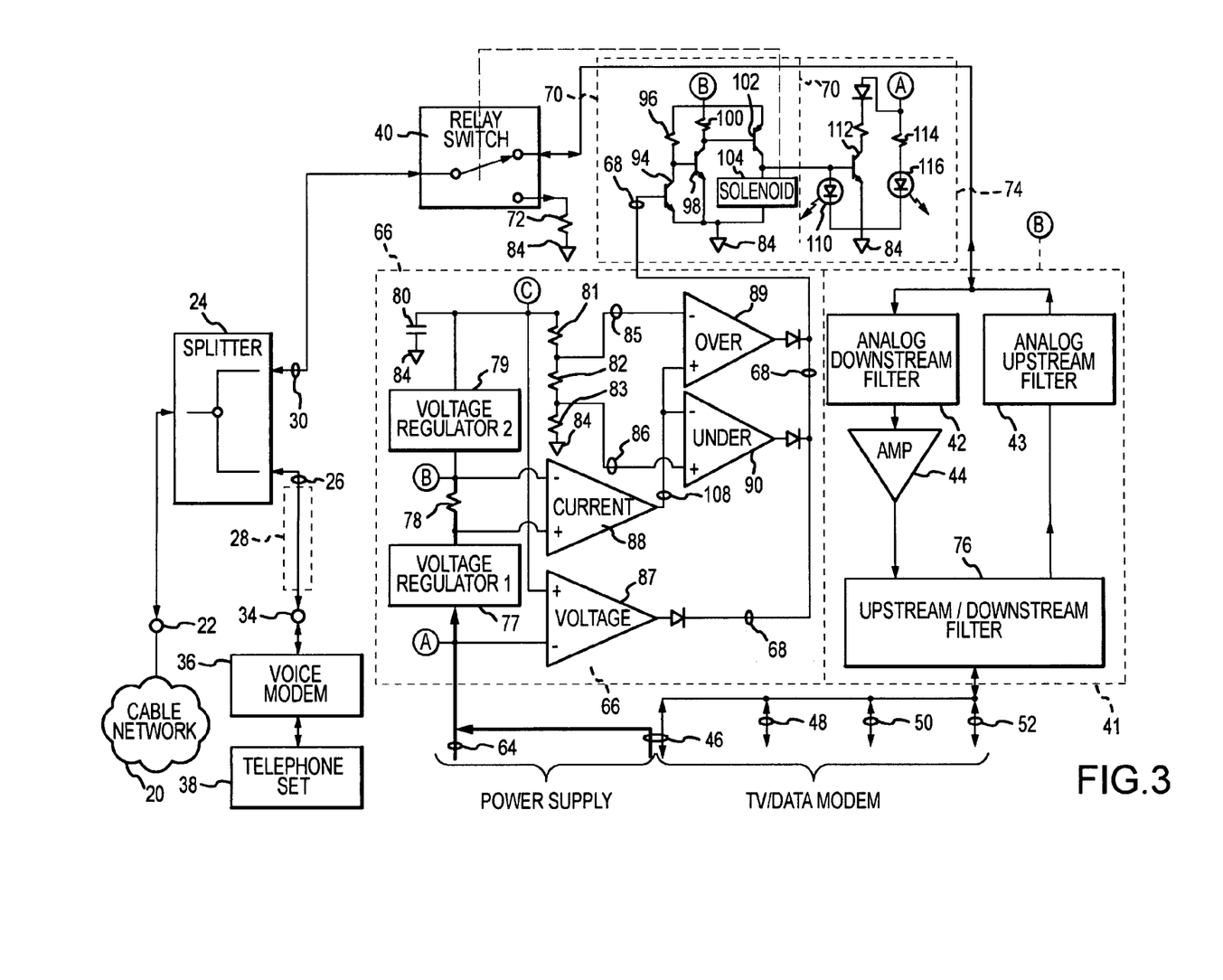
FIG. 3 is a more detailed block and schematic diagram of the components shown in FIG. 2.

The active branch signals 30 are supplied to a relay switch 40 which, when in its normal operative position shown in FIGS. 2 and 3, conducts the active branch downstream signals 30 to active branch circuitry 41 of the terminal adapter 10. The active branch circuitry 41 includes an analog downstream filter 42, an analog upstream filter 43 and at least one active signal conditioner, such as a linear amplifier 44. The analog downstream filter 42 filters the active branch downstream signals 30 and supplies the filtered downstream signals to the amplifier 44. The amplifier 44 amplifies or conditions the downstream active branch signals 30 and supplies them to at least one, but preferably, a plurality of active ports 46, 48, 50 and 52. The active ports 46, 48, 50 and 52 deliver the amplified or conditioned active branch downstream signals 30 to subscriber devices located at the subscriber premises 18 (FIG. 1), such as television sets (TV) and/or data modems 54, 56, 58 and 60. Other data processing devices, such as computers, are connected to the data modems.

The equipment at the subscriber's premises typically generates upstream signals which are supplied to the terminal adapter 10 for subsequent delivery to the headend (not shown) of the cable network 20. The upstream signals may be generated by the any the subscriber devices connected to any of the active ports 46, 48, 50 and 52. For example, one or more of the TV sets 54, 56, 58 and 60 may have conventional set top boxes (not shown) associated with them to allow the subscriber/viewer to make programming and viewing selections. Of course, any computers (not shown) connected to the data modems 54, 56, 58 and 60 typically communicate upstream signals.

The upstream signals from the devices at the subscriber's premises may be amplified by a reverse amplifier or reverse signal conditioner (neither shown) of the terminal adapter 10, before those amplified or conditioned upstream signals are delivered to the relay switch 40, the splitter 24, the cable terminal 22 and the cable network 20. Amplifying or conditioning the upstream signals is optional, since the upstream signals from subscriber devices are often passively transmitted without amplification through the active branch circuit 32 to the cable network 20. If a reverse amplifier or reverse signal conditioner (neither shown) is employed in a terminal adapter, such a device is connected in series with the analog upstream filter 43 to create an amplifying effect.

Electrical power for the active branch circuitry 41 and other components of the terminal adapter 10 is supplied from a conventional DC power supply 62 connected to a dedicated power input port 64. Alternatively, electrical power can be supplied through a conventional power inserter (also shown at 54) that is connected to the port 46. The power inserter allows relatively low voltage DC power to be conducted through the same port that also conducts the high-frequency signals, which in the situation shown in FIGS. 2 and 3, is the port 46. A power-signal divider 65 separates the high-frequency signals from the low voltage DC power and conducts the high-frequency signals to the active branch circuitry 41 and conducts the low voltage DC power to the same point that power is supplied from the dedicated port 64. Thus, regardless of whether electrical power is supplied through either one of the ports 46 or 64, the DC power operates the active components of the terminal adapter 10.

Use of a conventional power inserter connected to one of the ports, e.g. port 46, eliminates the need for a separate dedicated power supply port 64, or provides an alternative port through which electrical power can also be applied. The power supply 62 or the power supplied from the port 46 is typically derived from a conventional wall outlet (not shown) within the subscriber premises 18.

The ports 22, 34, 46, 48, 50, 52 and 64 are each preferably formed by a conventional female coaxial cable connector (shown in FIG. 1) which is mechanically connected to the housing 12 (FIG. 1) and which is electrically connected to certain internal components (FIGS. 2 and 3) of the terminal adapter 10. Using a female coaxial cable connector for the ports 22, 34, 46, 48, 50, 52 and 64 facilitates connecting coaxial cables (not shown) to the terminal adapter 10, by mechanically connecting the corresponding mating male coaxial cable connector (not shown) on the coaxial cable to the female coaxial cable connectors forming the ports 22, 34, 48, 50, 52, 54 and 64.

The present invention automatically minimizes or reduces return loss by preventing excessive signal reflections which affect downstream signals passing through the passive branch circuit 28, in the event that the components of the terminal adapter, principally those of the active circuitry 41, become inoperative or abnormally operative. An inoperative or abnormally operative condition changes the impedance of the active circuitry 41, causing downstream signals to reflect back from the active circuitry 41 into the splitter 24, where those reflected signals interfere with and degrade the characteristics of the passive branch signals 26.

The proclivity for high-frequency signals to reflect is related to the impedance characteristics of the termination of the conductor which conducts those signals and to the frequency of those signals. For this reason, coaxial cables are typically terminated by connecting a terminating impedance between the signal-carrying center conductor and the surrounding reference plane shielding which has a terminating impedance value equal to a characteristic impedance between the signal-carrying conductor and the reference plane shielding. When the active circuitry 41 becomes inoperative or abnormally operative, the impedance of the active circuitry 41 enters an unintended and unanticipated state and causes significantly increased signal reflection, which leads to significantly increased return loss. Return loss refers to the amount of degradation of incident signals caused by reflected signals. An increase in the amount of the reflected signals increases the degradation of the incident signals, thereby causing a loss in the quality or fidelity of the incident signals. A greater amount of return loss equates to more downstream signal reflection. Minimizing the return loss maximizes the quality and fidelity of the downstream signals.

The active circuitry 41 enters an unanticipated impedance state, which alters the impedance of the active circuitry 41, if the terminal adapter 10 becomes inoperative as a result of losing its supply of applied electrical power or losing an adequate supply of applied electrical power. Under such circumstances the voltage from the power supply diminishes. A power loss of this nature may result from a failed power supply 62, or a disconnection or breakage in the conductor which supplies the electrical power from the power supply to one of the power input port 64 or 46.

The active circuitry also enters an unanticipated impedance state, which alters the impedance of the active circuitry 41, if a component of the terminal adapter fails and causes it (principally the amplifier 44) to consume an excessive amount of current, as would occur if a component failure caused a short circuit, or if a component of the terminal adapter fails and causes it (principally the amplifier 44) to consume a diminished amount of current, as would occur if a component failure caused an open circuit. The current drawn by the active circuitry 41 increases if the amplifier 44 enters a short-circuit condition, and the current drawn by the active circuitry 41 decreases if the amplifier 44 enters an open-circuit condition. Even if some other circuit component of the active circuit 41 becomes defective, that other circuit component has the potential of adversely affecting the amplifier 44, and may cause the amplifier 44 to consume more or less current than it would normally supply.

A sensor 66, shown in FIG. 2, responds to changes in the voltage of the power supplied and/or to changes in the current consumed by the terminal adapter 10. Under inoperative or abnormally operative conditions, the sensor 66 sends a control signal 68 to a switch driver 70. The switch driver 70 responds to the control signal 68 by causing the relay switch 40 to disconnect the active circuitry 41 from the active branch circuit 32 and to substitute a predetermined termination impedance 72 as the impedance for the active branch circuit 32.

The impedance value and characteristics of the termination impedance 72 are selected to minimize the signal reflections into the splitter 24 and the cable network 20, thereby minimizing the return loss and preserving the characteristics of the passive signals 26 conducted in the passive branch 28. The impedance value of the termination impedance 72 is preferably selected to match the inherent characteristic impedance of the coaxial cables which form the cable network 20. Matching the termination impedance to the characteristic impedance of the coaxial cables minimizes signal reflections, for reasons which are well known. Since the typical coaxial cable has an inherent impedance of 75 ohms, the termination impedance has an impedance value of 75 ohms. Although the termination impedance 72 is shown and described as a single impedance element, it could also formed by a combination of real and reactive impedance elements.

By preserving the characteristic of the passive signals 28, the very important or essential subscriber devices, such as a "life-line" telephone set 38, will continue to operate without a substantial decrease in performance. Maintaining the telephone set 38 in a functional state is important in assuring the subscriber access to effective communication in emergency and urgent situations, as well as generally permitting high-fidelity voice communications under circumstances where an abnormally operative condition of the active circuitry 41 would prevent high-fidelity voice communications.

Of course when the active circuitry 41 is disconnected, active signals are not conducted to the subscriber devices 54, 56, 58 and 60. High-quality signals would not be available to these subscriber devices in any event because the inoperative or abnormally operative condition of the terminal adapter. The subscriber devices connected to the active ports 46, 48, 50 and 52 are considered expendable in operation in order to preserve the more critical functionality of "life-line" passive telephone communications through the telephone set 38.

Under normal operative conditions, the relay switch 40 is held in its normal operating position shown in FIGS. 2 and 3. Under inoperative or abnormally operative conditions, the switch driver 70 does not supply energy to hold the relay switch 40 in the normal operating position shown in FIGS. 2 and 3, but instead the relay switch 40 naturally moves under the influence of its own internal mechanical bias to the alternative position (not shown) where the termination impedance 72 is connected in substitution for the active circuitry 41 in the active branch circuit 32.

When normal power delivery resumes and when power is normally supplied, the switch driver 70 will move the relay switch 40 to the normal operating position shown in FIGS. 2 and 3. However, it is unlikely that a component failure or degradation will be temporary, so it is unlikely that the terminal adapter will resume normal operation after an excessive amount of current is consumed due to a failed or degraded component or after a minimal amount of current is consumed due to a failed or degraded component.

An indicator 74 is attached to the switch driver 70. Whenever the switch driver 70 holds the relay switch 40 in the normal position shown, the indicator 74 delivers an indication of normal functionality, such as a green light. Whenever the switch driver 70 allows the relay switch 40 to connect the termination impedance 72 in substitution for the active circuitry 41, the indicator 74 delivers a different type of indication, such as a red light, which indicates an inoperative or abnormally operative condition. Of course, if there is a lack of power to the terminal adapter 10, the indicator 74 will not deliver any type of indication. The lack of any indication itself indicates a loss of power. The indicator 74 delivers the indication through a view window 75 in the housing 12 (FIG. 1).

More details concerning the sensor 66 and its interaction with the other components of the terminal adapter 10 are shown in FIG. 3. Downstream signals from the cable network 20 are divided by the splitter 24 into the downstream passive branch signals 26 and the downstream active branch signals 30. The downstream active branch signals 30 are supplied to the relay switch 40, which is shown in FIG. 3 in its normal operating position conducting the downstream active branch signals 30 to the active circuitry 41. After filtering in the analog downstream filter 42, the downstream active branch signals 30 are applied to the amplifier 44, where the magnitude of those signals is amplified, modified or conditioned and thereafter supplied to an upstream/downstream filter 76. The filter 76 supplies the filtered active downstream signals to the active ports 46, 48, 50 and 52, and from there to subscriber devices such as the TV sets and data modems 54, 56, 58 and 60. Upstream signals generated by the subscriber devices 54-60 are supplied through the active ports 46-52 through the upstream/downstream filter 76 and the analog upstream filter 43, and conducted back through the relay switch 40 while in its normal operating position to the splitter 24 and into the cable network 20 through the cable port 22. The filters 42, 43 and 76 are conventional. The filters 42 and 43 form a conventional diplexer.

The DC electrical power supplied at the input ports 46 and 64 is typically from a conventional low-voltage transformer power supply that is connected to a conventional AC electrical power outlet. The input electrical power is supplied to node A, and is typically at a upper level of about 16 volts, for example. The input electrical power is applied to a first voltage regulator 77, which reduces the upper level voltage at node A to an intermediate voltage level at node B, such as 9 volts, for example. The first voltage regulator 77 supplies the majority of the electrical power to the components of the terminal adapter 10 from node B, although power for the indicator 74 is supplied from node A. The electrical current delivered from the first voltage regulator 77 to node B flows through a current sense resistor 78.

The level voltage at node B is applied to a second voltage regulator 79, which further reduces the voltage to a low level at node C, such as 5 volts, for example. The second voltage regulator 79 regulates the low level output voltage at node C to a constant level, and applies that low-voltage level to a storage capacitor 80 which further acts to maintain a constant voltage at node C. The voltage at node C is supplied to a resistor divider network formed by resistors 81, 82 and 83. The resistors 81, 82 and 83 are connected in series between node C and a voltage reference 84 of the terminal adapter. Because the voltage at node C is relatively constant, the voltage 85 at the junction between resistors 81 and 82, and a voltage 86 at the junction between resistors 82 and 83, are likewise relatively constant. The values of the resistors 81, 82 and 83 are selected to establish the voltage 85 at a value which is indicative of an over-current condition of the terminal adapter (principally exemplified by a short-circuit condition of the amplifier 44 in the active circuitry 41), and to establish the voltage 86 at a value which is indicative of an under-current condition of the terminal adapter (principally exemplified by an open-circuit condition of the amplifier 44 in the active circuitry 41).

The voltages 85 and 86, the voltages at nodes A and C and the voltage across the current sense resistor 78 are applied to operational amplifiers (op amps) 87, 88, 89 and 90 to detect the inoperative and abnormally operative conditions.

To detect a low-voltage input power condition, the voltage at node A is compared with the voltage at node C, at negative and positive input terminals of the op amp 87, which functions as a comparator. Because the voltage at node C will remain stable at its low level for a short time after the supply voltage decreases at node A, due to the action of the voltage regulators 77 and 79 and the storage capacitor 80, comparing the voltage at node A with the voltage at node C provides an indication when the input voltage diminishes to a level where the functionality of the terminal adapter 10 is not reliable.

Under normal conditions, because the voltage at node A is greater than the voltage at node C, the op amp comparator 87 supplies the control signal 68 at a logic low level. The low-level control signal 68 is applied to a first NPN transistor 94 of the switch driver 70. The low-level signal biases the NPN transistor 94 into a nonconductive state, thereby causing current to flow through a resistor 96 and to the base of an NPN transistor 98. The transistor 98 is biased into a fully conductive state, causing current to flow through a resistor 100. The conductive transistor 98 and the current flow through the resistor 100 bias a PNP transistor 102 into a fully conductive state. The conductive transistor 102 conducts current through a relay solenoid 104 to hold the relay switch 40 in the normal operating position shown in FIG. 3. Only energizing the relay solenoid 104 will move the relay switch 40 to the normal operating position shown in FIG. 3. When the relay solenoid 104 is not energized, the relay switch 40 will revert to the alternative position where the relay switch 40 conducts the downstream active branch signals 30 through the termination impedance 72.

If the voltage of the input power begins to decline to a point which is lower than the voltage at node C, the voltage comparator 87 supplies a logic high level control signal 68. The high-level control signal 68 biases the NPN transistor 94 into conductivity, which in turn biases the NPN transistor 98 into a nonconductive state. The nonconductive transistor 98 biases on the NPN transistor 102 into a non-conductive state, thereby terminating the current flow through the relay solenoid 104.

With the relay solenoid 104 no longer energized or activated, the relay switch 40 moves to the alternative position from that shown in FIG. 3, thereby connecting the termination impedance 72 in place of the active circuitry 41. Thus, under low input voltage conditions, the voltage comparator 87 causes the relay switch 40 to connect the termination impedance 72 in place of the active circuitry 41. Signal reflections to the passive branch circuit 28 (FIG. 2) are minimized, thereby minimizing the return loss which would otherwise adversely influence the passive branch signals 26.

Under normal operating conditions, the current consumed by the terminal adapter 10 remains within a normal range of current levels. The current consumed by the terminal adapter 10 is conducted through the current sensing resistor 78. The voltage across the current sensing resistor 78, caused by the amount of current it conducts, represents the amount of current conducted by the terminal adapter 10. Positive and negative input terminals of a current sensing op amp 88 are connected across the current sensing resistor 78. A voltage signal 108 is developed by the op amp 88 which relates to the amount of current conducted through the sensing resistor 78. Thus, the voltage signal 108 from the op amp 88 represents the amount of current conducted by the terminal adapter 10.

The voltage signal 108 from the op amp 88 is compared to the voltage signals 85 and 86 by the comparators 89 and 90, respectively, to recognize normal operating conditions, an inoperative condition or abnormally operative conditions. The inoperative or abnormal operative condition may be caused by a malfunction of the amplifier 44, a failure of one of the biasing components of the amplifier 44, or a failure of one of the other passive components within the filters 43, 44 and 76 which adversely affect the bias and current consumption of the amplifier 44 itself, for example.

Figure 4A:
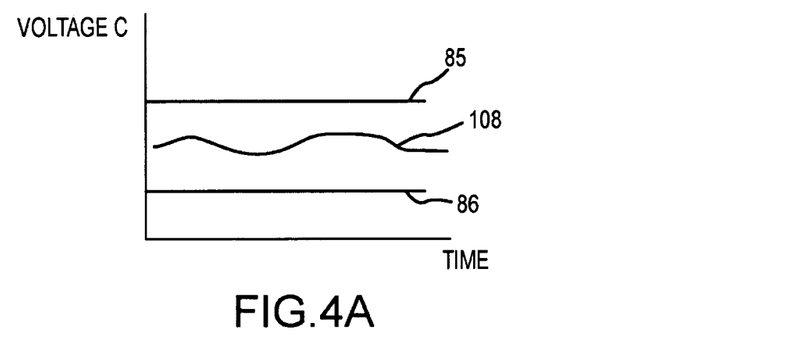
FIGS. 4A, 4B and 4C are graphs of signals which illustrate a normal operating condition, and over-current abnormally operative condition and an under-current abnormally operative condition, respectively, of a sensor shown in FIG. 3.

Normal operating conditions are illustrated in FIG. 4A. The voltage level of the current-related signal 108 remains less than the voltage 85 and greater than the voltage 86. Under these conditions, the current related voltage signal 108 indicates that the terminal adapter 10 is drawing current within its normal range of current ranges between the upper limit represented by the voltage 85 and the lower limit represented by the voltage 86. Because the current-related voltage signal 108 is less than the voltage 85, the comparator 89 supplies a low level output control signal 68. Similarly, because the current related signal 108 is greater than the voltage 86, the comparator 90 supplies a low level output control signal 68. Of course under these circumstances, with adequate power being supplied to the terminal adapter 10, the voltage comparator 87 also supplies a low level output control signal 68. Consequently, the transistor 94 is biased into a nonconductive state, while the transistors 98 and 102 are biased into conductive states, which cause current to flow through the relay solenoid 104 to hold the relay switch 40 in the normal operating position shown in FIG. 3.

Figure 4B:
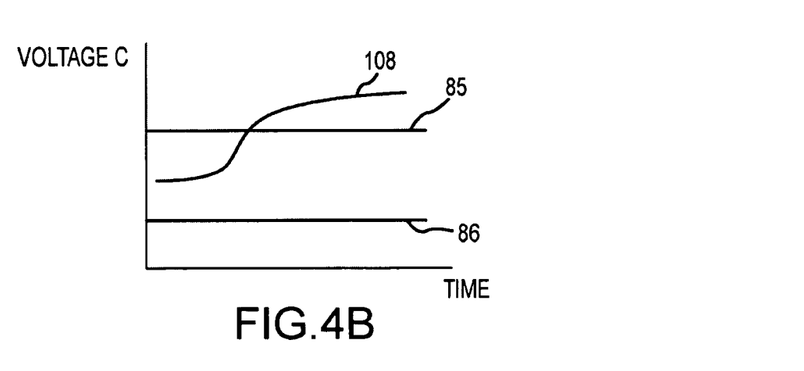

The inoperative or abnormally operative condition caused by the terminal adapter 10 consuming more than the normal upper limit of the range of current is shown graphically in FIG. 4B. Under conditions of excessive current consumption, the voltage across the sensing resistor 78 increases, and that signal is amplified by the op amp 88. The voltage level of the signal 108 exceeds the voltage 85. Under such circumstances, the voltage signal 108 to the positive input terminal of the op amp comparator 89 exceeds the level of the voltage 85 applied to the negative input terminal of the op amp comparator 89, causing the comparator 89 to supply a high-level logic signal as the control signal 68. The high logic signal 68 causes the transistor 94 to conduct, which in turn biases the transistor 98 into a nonconductive state thereby causing the transistor 102 to become nonconductive. The relay solenoid 104 ceases conducting current, allowing the mechanical bias on the relay switch 40 to move the switch to the alternative position from that shown in FIG. 3. The alternative position of the relay switch 40 connects the termination impedance 72 to the splitter 24 in place of the active circuitry 41. Thus, in over-current or short-circuit conditions of the terminal adapter 10, represented by high current consumption sensed at the sensing resistor 78, an inoperative or abnormally operative condition is indicated, and the termination impedance 72 is connected to thereby minimize signal reflections and return loss.

During the over-current condition described in the preceding paragraph, the current-related voltage signal 108 exceeds the voltage 86, causing the op amp comparator 90 to supply a low-level signal. Similarly, the voltage sensing op amp 87 also supplies a low-level signal because the level of voltage supplied to the terminal adapter 10 remains normal. Consequently, the over-current sensing op amp 89 controls the high level control signal 68 supplied to the switch driver 70.

Figure 4C:
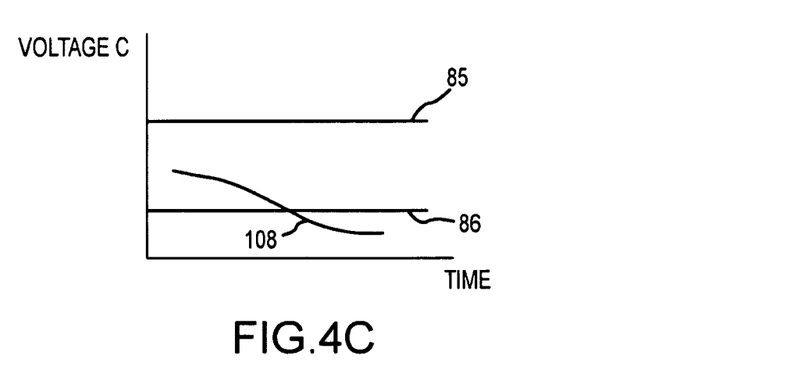

The inoperative or abnormally operative condition of the terminal adapter 10 consuming less than the lower limit of the normal range of current is shown graphically in FIG. 4C. Under conditions of minimal current consumption, the voltage across the sensing resistor 78 decreases. The diminished value of the signal across the sensing resistor 78 is amplified by the op amp 88. The voltage level of the signal 108 is less than the voltage 86. Under such circumstances, the voltage signal 108 to the negative input terminal of the op amp comparator 90 is less than the level of the voltage 86 applied to the positive input terminal of the op amp comparator 90, causing the comparator 90 to supply a high-level logic signal as the control signal 68. The high logic signal 68 causes the transistor 94 to become conductive, which in turn biases the transistor 98 into a nonconductive state thereby causing the transistor 102 to become nonconductive. The relay solenoid 104 ceases conducting current, allowing the mechanical bias on the relay switch 40 to move the switch to the alternative position from that shown in FIG. 3. The alternative position of the relay switch 40 connects the termination impedance 72 to the splitter 24 in place of the active circuitry 41. Thus, in under-current or open-circuit conditions of the terminal adapter 10, represented by low current consumption sensed at the sensing resistor 78, an inoperative or abnormally operative condition is indicated, and the termination impedance 72 is connected as the active branch 32 to thereby minimize signal reflections and return loss.

During the under-current condition described in the preceding paragraph, the current-related voltage signal 108 is less than the voltage 85, causing the op amp comparator 89 to supply a low-level signal. Similarly, the voltage sensing op amp 87 also supplies a low-level signal because the level of voltage supplied to the terminal adapter 10 remains normal. Consequently, the under-current sensing op amp 90 controls the high level control signal 68 supplied to the switch driver 70.

Under normal operating conditions, when the transistor 102 is conductive and the relay solenoid 104 is energized, an LED 110 also receives power from the conductive transistor 102. The LED 110 preferably emits a color of light, such as green light, indicating normal functionality of the terminal adapter 10. The LED 110 is therefore illuminated to indicate normal functionality whenever the relay solenoid 104 is energized by the conductive transistor 102. The conductive transistor 102 also provides a bias signal to a NPN transistor 112, causing the transistor 112 to conduct current through the resistor 114 from the voltage at node A. The conductive transistor 112 diverts current flow from a second LED 116, preventing energization and light emission from the LED 116. However, in the event of any of the abnormally operative conditions discussed above, the transistor 102 becomes nonconductive, causing the transistor 112 to become nonconductive and allowing current flow through the resistor 114 to the LED 116. The LED 116 is energized and emits light of a color to indicate an abnormally operative condition, such as red light. The light from the LEDs 110 and 116 is conducted through a view window 75 formed in the housing 12 of the terminal adapter 10, as shown in FIG. 1.

Thus, the light emitted from the LED 110 constitutes a visual signal indicating a normal operative condition, during which the upstream and downstream active branch signals 30 are conducted through the active circuitry 41. The light emitted from the LED 116 constitutes a visual signal indicating an abnormally operative condition, during which the upstream and downstream active branch signals are conducted through the termination impedance 72. Emission of no light from the from the view window 75 formed in the housing 12 (FIG. 1) is in itself an indication of an inoperative condition, typically caused by a lack of power supplied to the terminal adapter 10. Under such circumstances, the upstream and downstream active branch signals are conducted through the termination impedance 72.

Minimizing the return loss by connecting the termination impedance 72 as the active circuit branch 32 (FIG. 2) maintains the reliability and fidelity of the passive downstream signals conducted by the splitter 24 to passive signal-responsive subscriber equipment such as the voice modem 36 and the telephone 38. The reliability of communications when using such passive equipment is enhanced under conditions where an inoperative or abnormally operative condition may occur in the active circuitry 41 of the active circuit branch 32. Connecting the termination impedance 72 enhances the capability of communication through the essential passive subscriber equipment, which can be very important under urgent and emergency circumstances.

The significance of these and other improvements and advantages will become apparent upon gaining a full appreciation of the ramifications and improvements of the present invention. A preferred embodiment of the invention and many of its improvements have been described with a degree of particularity. The detail of the description is of preferred examples of implementing the invention. The detail of the description is not necessarily intended to limit the scope of the invention. The scope of the invention is defined by the following claims.

The invention claimed is:

1. A passive-active terminal adapter for use in connecting subscriber devices to receive downstream signals from a cable television network and to deliver upstream signals from the subscriber devices to the network, in which electrical power is supplied to operate the terminal adapter, comprising:

a signal splitter which separates downstream signals into active branch downstream signals and passive branch downstream signals;

a passive branch circuit receptive of the passive branch downstream signals;

an active branch circuit receptive of the active branch downstream signals, the active branch circuit including an active signal conditioner which modifies characteristics of the active branch downstream signals conducted through the active branch circuit;

a sensor connected to sense power consumption of the active branch circuit indicative of a normal operative condition, an inoperative operative condition, and an abnormally operative condition of the terminal adapter, the sensor supplying a first control signal indicative of normal operating conditions and supplying a second control signal indicative of inoperative and abnormal operating conditions, wherein the sensor senses current consumed by the terminal adapter and voltage supplied to the terminal adapter and determines the normal operating condition, the inoperative condition and the abnormally operative condition from an amount of current consumed and a level of voltage supplied relative to a predetermined range of current consumption, and further wherein the sensor senses an amount of current consumption less than or greater than the predetermined range of current consumption to determine the abnormally operative condition;

a termination impedance having a predetermined impedance characteristic; and a switch receptive of the first and second control signals and connected to the signal splitter and the active branch circuit and the termination impedance, the switch having a first operative position which conducts the active branch downstream signals from the splitter to the active branch circuit, the switch also having a second operative position which conducts the active branch downstream signals from the splitter to the termination impedance and which disconnects the active branch circuit from the splitter, the switch assuming the first operative position in response to the first control signal and assuming the second operative position in response to the second control signal.

2. A passive-active terminal adapter as defined in claim 1, wherein the active signal conditioner is operable to modify characteristics of the active branch downstream signals conducted through the active branch circuit; and the sensor senses power consumption by sensing the current consumption.

3. A passive-active terminal adapter as defined in claim 2, wherein the active signal conditioner includes an amplifier.

4. A passive-active terminal adapter as defined in claim 1, wherein the sensor determines the normal operative condition and the inoperative condition relative to a predetermined range of voltage of the power supplied to the terminal adapter.

5. A passive-active terminal adapter as defined in claim 1, wherein the predetermined impedance characteristic of the termination impedance is a predetermined impedance value which minimizes return loss in the passive branch signals when the switch is in the second operative position.

6. A passive-active terminal adapter as defined in claim 1, wherein the predetermined impedance characteristic of the termination impedance has a predetermined impedance value which minimizes signal reflections through the splitter into the cable television network when the switch is in the second operative position.

7. A passive-active terminal adapter as defined in claim 6, for use with both passive subscriber devices and active subscriber devices, and for connection to a coaxial cable through which the downstream and upstream signals are conducted from and to the cable television network, the coaxial cable having a predetermined impedance characteristic, and the terminal adapter further comprising:
an input port through which the upstream and downstream signals are conducted, wherein the input port is configured to be connected to the coaxial cable;
a passive port through which the passive branch signals are conducted to a passive subscriber device;
an active port through which active branch downstream signals are conducted to at least one active subscriber device; and
a predetermined characteristic of a termination impedance that is substantially equal to the characteristic impedance of a coaxial cable.

8. A passive-active terminal adapter as defined in claim 7, wherein the passive subscriber device comprises a voice modem and a telephone set.

9. The passive-active terminal adapter of claim 1, wherein the sensor is configured to sense a first type of operating state and a second type of operating state, the second type of operating state being different from the first type of operating state.

10. The passive-active terminal adapter of claim 9, wherein one of the first type of operating state and the second type of operating state is the abnormally operative condition.

11. The passive-active terminal adapter of claim 9, including a visual indicator configured to deliver an indication of normal and abnormal functionality.

12. The passive-active terminal adapter of claim 9, including a visual indicator configured to deliver an indication of an inoperative current conduction.

13. The passive-active terminal adapter of claim 1, wherein the abnormally operative condition includes abnormally high levels of current conduction and abnormally low levels of current conduction.

14. The passive-active terminal adapter of claim 1, wherein the abnormally operative condition is caused by a malfunctioning of the active signal conditioner.

15. A method of minimizing return loss in downstream signals conducted through a passive branch circuit of a passive-active terminal adapter which also includes an active branch circuit which conducts downstream signals, comprising:
connecting the active and passive branch circuits of the terminal adapter to receive downstream signals from a cable television network;
supplying electrical power to the terminal adapter;
sensing current consumed by the terminal adapter and voltage supplied to the terminal adapter;
recognizing a normal operating condition, an inoperative condition and an abnormally operative condition from a sensed amount of current consumed and a sensed level of voltage supplied;
providing a control signal that is indicative of normal operation condition to the passive-active terminal adapter in response to the normal operation condition that was recognized; and
substituting a termination impedance having a predetermined impedance characteristic for the active branch circuit in response to the inoperative condition or the abnormally operative condition that was recognized.

16. A method as defined in claim 15, further comprising:
connecting a voice modem and a telephone set to the passive branch circuit to receive downstream signals from the cable television network.

17. A method as defined in claim 15, wherein the recognizing the normal operating condition and the abnormally operative condition is recognized relative to a predetermined range of current consumption.

18. A method as defined in claim 17, further comprising:
sensing an amount of current consumption greater than the predetermined range of current consumption to recognize the abnormally operative condition.

19. A method as defined in claim 17, further comprising:
sensing an amount of current consumption less than the predetermined range of current consumption to recognize the abnormally operative condition.

20. A method as defined in claim 15, wherein the recognizing the normal operative condition and the inoperative condition is recognized relative to a predetermined range of voltage supplied to the terminal adapter.

21. A method as defined in claim 15, further comprising:
disconnecting the active branch circuit when substituting the termination impedance.

22. A method as defined in claim 15, further comprising:
using a predetermined impedance value for the termination impedance to minimize return loss.

23. A method as defined in claim 15, wherein the cable television network includes coaxial cables having a predetermined characteristic impedance value, and further comprising:
connecting the coaxial cables having the predetermined characteristic impedance value to the passive and active branch circuits of the terminal adapter; and
using an impedance value for the termination impedance which is substantially equal to a predetermined characteristic impedance value of the coaxial cables.

24. A method as defined in claim 15, further comprising:
using a predetermined impedance value for the termination impedance which is selected to minimize signal reflections into the cable television network.

25. The method of claim 15, wherein the abnormally operative condition is caused by a malfunctioning of an active signal conditioner.

26. A passive-active terminal adapter for use in connecting subscriber devices to receive downstream signals from a cable television network and to deliver upstream signals from the subscriber devices to the network, in which electrical power is supplied to operate the terminal adapter, comprising:
active and passive branch circuits configured to be connected of the terminal adapter to receive downstream signals from a cable television network, wherein electrical power is configured to be supplied to the terminal adapter;
a sensor configured to sense current consumed by the terminal adapter and voltage supplied to the terminal adapter, wherein the sensor is configured to:
recognize a normal operating condition, an inoperative condition and an abnormally operative condition from a sensed amount of current consumed and a sensed level of voltage supplied;
provide a control signal that is indicative of normal operation condition to the passive-active terminal adapter in response to the normal operation condition that was recognized; and
substitute a termination impedance having a predetermined impedance characteristic for the active branch circuit in response to the inoperative condition or the abnormally operative condition that was recognized.

27. The passive-active terminal adapter in claim 26, wherein the passive-active terminal adapter is configured to be connected a voice modem and a telephone set to the passive branch circuit to receive downstream signals from the cable television network.

28. The passive-active terminal adapter in claim 26, wherein the normal operating condition and the abnormally operative condition is recognized relative to a predetermined range of current consumption.

29. The passive-active terminal adapter in claim 28, wherein the sensor is further configured to sense an amount of current consumption greater than the predetermined range of current consumption to recognize the abnormally operative condition.

30. The passive-active terminal adapter in claim 28, wherein the sensor is further configured to sense an amount of current consumption less than the predetermined range of current consumption to recognize the abnormally operative condition.

31. The passive-active terminal adapter in claim 26, wherein the normal operative condition and the inoperative condition are recognized relative to a predetermined range of voltage supplied to the terminal adapter.

32. The passive-active terminal adapter in claim 26, wherein the active branch circuit is disconnected when substituting the termination impedance.

33. The passive-active terminal adapter in claim 26, wherein a predetermined impedance value is used for the termination impedance to minimize return loss.

34. The passive-active terminal adapter in claim 26, wherein the cable television network includes coaxial cables having a predetermined characteristic impedance value, the coaxial cables are connected having the predetermined characteristic impedance value to the passive and active branch circuits of the terminal adapter, and an impedance value is used for the termination impedance which is substantially equal to a predetermined characteristic impedance value of the coaxial cables.

35. The passive-active terminal adapter in claim 26, wherein a predetermined impedance value is used for the termination impedance which is selected to minimize signal reflections into the cable television network.

* * * * *